(12) United States Patent
Matheja et al.

(10) Patent No.: US 11,367,437 B2
(45) Date of Patent: Jun. 21, 2022

(54) MULTI-MICROPHONE SPEECH DIALOG SYSTEM FOR MULTIPLE SPATIAL ZONES

(71) Applicant: NUANCE COMMUNICATIONS, INC., Burlington, MA (US)

(72) Inventors: Timo Matheja, Neu-Ulm (DE); Markus Buck, Biberach (DE); Andreas Kirbach, Blaustein (DE); Martin Roessler, Ulm (DE); Tim Haulick, Blaubeuren (DE); Julien Premont, Neu-Ulm (DE); Josef Anastasiadis, Aachen (DE); Rudi Vuerinckx, Sint Lambrechts Woluwe (BE); Christophe Ris, Taintignies (BE); Stijn Verschaeren, Stekene (BE); Hakan Ari, Brussels (BE); Dieter Ranz, Memmingen (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 174 days.

(21) Appl. No.: 16/426,356

(22) Filed: May 30, 2019

(65) Prior Publication Data
US 2020/0380967 A1    Dec. 3, 2020

(51) Int. Cl.
| | | |
|---|---|---|
| *G10L 15/20* | (2006.01) | |
| *G10L 17/00* | (2013.01) | |
| *G10L 15/22* | (2006.01) | |
| *H04R 1/40*  | (2006.01) | |
| *G10L 21/02* | (2013.01) | |

(52) U.S. Cl.
CPC ............. *G10L 15/22* (2013.01); *G10L 21/02* (2013.01); *H04R 1/406* (2013.01); *G10L 2015/227* (2013.01)

(58) Field of Classification Search
CPC ............. H04M 2201/40; H04M 1/645; H04M 2250/74; H04M 3/385; B60R 16/0373; G10L 15/04; G10L 25/93
USPC ......................................... 704/231, 246, 251
See application file for complete search history.

(56) References Cited

U.S. PATENT DOCUMENTS

| | | |
|---|---|---|
| 9,437,188 B1 | 9/2016 | Medina et al. |
| 10,229,686 B2 | 3/2019 | Buck et al. |
| 2013/0195285 A1 | 8/2013 | De La Fuente et al. |

(Continued)

OTHER PUBLICATIONS

International Search Report dated Aug. 12, 2020 from corresponding International Application No. PCT/US2020/032521, 2 pages.

(Continued)

*Primary Examiner* — George C Monikang
(74) *Attorney, Agent, or Firm* — Brian J. Colandreo; Michael T. Abramson; Holland & Knight LLP

(57) ABSTRACT

There is provided a speech dialog system that includes a first microphone, a second microphone, a processor and a memory. The first microphone captures first audio from a first spatial zone, and produces a first audio signal. The second microphone captures second audio from a second spatial zone, and produces a second audio signal. The processor receives the first audio signal and the second audio signal, and the memory contains instructions that control the processor to perform operations of a speech enhancement module, an automatic speech recognition module, and a speech dialog module that performs a zone-dedicated speech dialog.

7 Claims, 12 Drawing Sheets

(56) References Cited

U.S. PATENT DOCUMENTS

| | | | |
|---|---|---|---|
| 2015/0046157 A1* | 2/2015 | Wolff | G10L 25/51 |
| | | | 704/231 |
| 2016/0027450 A1* | 1/2016 | Gao | G10L 19/125 |
| | | | 704/205 |
| 2017/0236512 A1 | 8/2017 | Williams et al. | |
| 2018/0158461 A1 | 6/2018 | Wolff et al. | |

OTHER PUBLICATIONS

Written Opinion dated Aug. 12, 2020 from corresponding International Application No. PCT/US2020/032521, 6 pages.

* cited by examiner

MULTI-MICROPHONE SPEECH DIALOG SYSTEM FOR MULTIPLE SPATIAL ZONES

BACKGROUND OF THE DISCLOSURE

1. Field of the Disclosure

The present disclosure relates to speech processing, and more particularly, to speech processing in an environment having a plurality of spatial zones, where the zone from which the speech originates is significant when evaluating the speech.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

Multi-microphone speech applications often need interaction between different components, such as a speech enhancement (SE) module, an automatic speech recognition (ASR) module, and a speech dialog (SD) module. These components are typically integrated in a framework application that controls interactions between these components. In current systems, typically:

(a) The SE performs multi-channel speech enhancement to provide an output signal with improved quality. Multi-channel speech enhancement may include acoustic echo cancellation, noise reduction and spatial filtering such as beamforming, speech signal separation or cross-talk cancellation. The SE typically provides one single output signal for the ASR, but the SE might be a multiple-input multiple-output system with more than one output. The output signal is typically sent in subsequent blocks with, for example, a block length of 16 milliseconds (ms).

(b) The ASR attempts to detect and recognize speech utterances, e.g., a wake-up-word (WuW) or a sequence of spoken words, based on the input signal, thus yielding a recognition result. In the present document, all references to a "WuW" are intended to cover wake-up words as well as other speech utterances.

(c) The SD might further process the recognition result of the ASR and perform further actions.

The SE can process input signals from multiple microphones to create a spatial focus on different spatial zones in order to capture signals of users, i.e., speakers, for example, by spatial filtering. The SE is able to produce a spatially focused output signal for "selective listening", i.e., suppression of speech signals interfering from other spatial zones. Alternatively, the SE can combine signals from different spatial zones comprising all available, or a subset of, spatial zones to provide an output signal for "broad listening", e.g., all desired speakers are included.

In a system with multiple microphones and multiple spatial zones, zone-dedicated speech dialogs with the users can be initiated by a WuW or by other speech utterances. While listening for the WuW, the system is spatially open for all spatial zones, i.e., broad listening. After a WuW has been detected, the system might proceed with a speech dialog where it is advantageous to allow just one spatial zone and realize a spatial focus to this spatial zone for further interaction with a user in that zone. During this phase, other spatial zones are to be ignored by the system, i.e., selective listening.

In some systems multiple microphones are covering multiple spatial zones, e.g., seats in an automobile, for interaction with users who are located in the spatial zones. Therefore, there might be a desire to conduct a speech dialog specifically with only one of these users, e.g., to control an air conditioner or a seat heater specifically for the seat of that user in the car. However, the knowledge of which spatial zone is showing speech activity is only present in the SE, but not available in the ASR or the SD. For a zone-dedicated speech dialog it is required that the SD is informed about which zone is the relevant spatial zone.

Even if the system somehow was able to detect the correct spatial zone where a user uttered the WuW, switching the SE from broad listening mode to selective listening mode might happen with some latency. This delay might result from a recognition process of the ASR, or from other latencies in the system. If the user continues with the dialog directly after speaking the WuW, the transition from broad listening to selective listening might happen in the middle of the user's speech utterance.

U.S. Pat. No. 10,229,686, for "Methods and apparatus for speech segmentation using multiple metadata", describes sending metadata to an ASR engine for a purpose of enhanced begin-of-speech detection. However, it does not mention sending zone activity information to help the ASR engine, or other system components outside of an SE, to identify a spatial zone in which a speaker is situated.

Some prior art systems employ a sequential broad listening/selective listening technique in which an SE provides a single output signal. After a WuW is detected, a framework application requests, from the SE, information on the spatial zone to which the listening should be switched, and an internal processing mode of the SE is dynamically switched from broad listening to selective listening. A drawback of this technique is that the framework application needs to control an internal SE configuration of broad/selective listening mode. Such an interaction between the application framework and the SE requires added complexity on the operation of the application framework. Another drawback of this technique is that the request to the SE to obtain information on the spatial zone where the WuW was spoken may be difficult to handle due to latencies between system components, and in a case where the components are running on different computers from one another, clock skews may be problematic.

Another prior art technique is an employment of parallel WuW detectors for increased robustness against interfering speech. With this technique, an SE permanently provides multiple spatially focused outputs that each refer to a selective listening mode for each zone in a group of multiple spatial zones. During a WuW phase, multiple instances of an ASR are active in parallel to operate on multiple output signals of the SE. After a WuW has been detected, a framework application selects one of the SE output signals for a speech dialog. A drawback of this technique is that it requires a high central processor unit (CPU) load due to multiple parallel active ASR instances.

SUMMARY OF THE DISCLOSURE

A technical problem addressed by the present disclosure is that an ASR is able to recognize speech utterances but cannot detect a spatial zone where the utterance has been spoken, and therewith cannot distinguish between desired and interfering speech components. A technical solution to this problem provided by the present disclosure is that the SE sends spatial zone activity information along with an audio signal to the ASR for further processing and distinguishing different spatial zone activities.

Another technical problem addressed by the present disclosure is that a seamless transition between broad listening and selective listening is not possible due to latencies in detection of an utterance and/or a detection of a zone. A technical solution to this problem provided by the present disclosure is to provide multiple audio streams, including broad listening and selective listening, from the SE to the ASR, buffer them to be able to "look back in time" and resume recognition in a relevant zone.

The present disclosure provides for a speech dialog system that includes a first microphone, a second microphone, a processor and a memory. The first microphone captures first audio from a first spatial zone, and produces a first audio signal. The second microphone that captures second audio from a second spatial zone, and produces a second audio signal. The processor receives the first audio signal and the second audio signal, and the memory contains instructions that control the processor to perform operations of:
(a) a speech enhancement (SE) module that:
  detects, from the first audio signal and the second audio signal, speech activity in at least one of the first spatial zone or the second spatial zone, thus yielding processed audio; and
  determines from which of the first zone or the second zone the processed audio originated, thus yielding zone activity information;
(b) an automatic speech recognition (ASR) module that:
  recognizes an utterance in the processed audio, thus yielding a recognized utterance; and
  based on the zone activity information, produces a zone decision that identifies from which of the first zone or the second zone the recognized utterance originated; and
(c) a speech dialog (SD) module that:
  performs a zone-dedicated speech dialog based on the recognized utterance and the zone decision.

Additionally, the SD module, based on the recognized utterance and the zone decision, decides from which of the first zone or the second zone to obtain additional audio, thus yielding a routing decision. The ASR module, based on the routing decision, obtains the additional audio from either of the first zone or the second zone, and recognizes an additional utterance in the additional audio.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
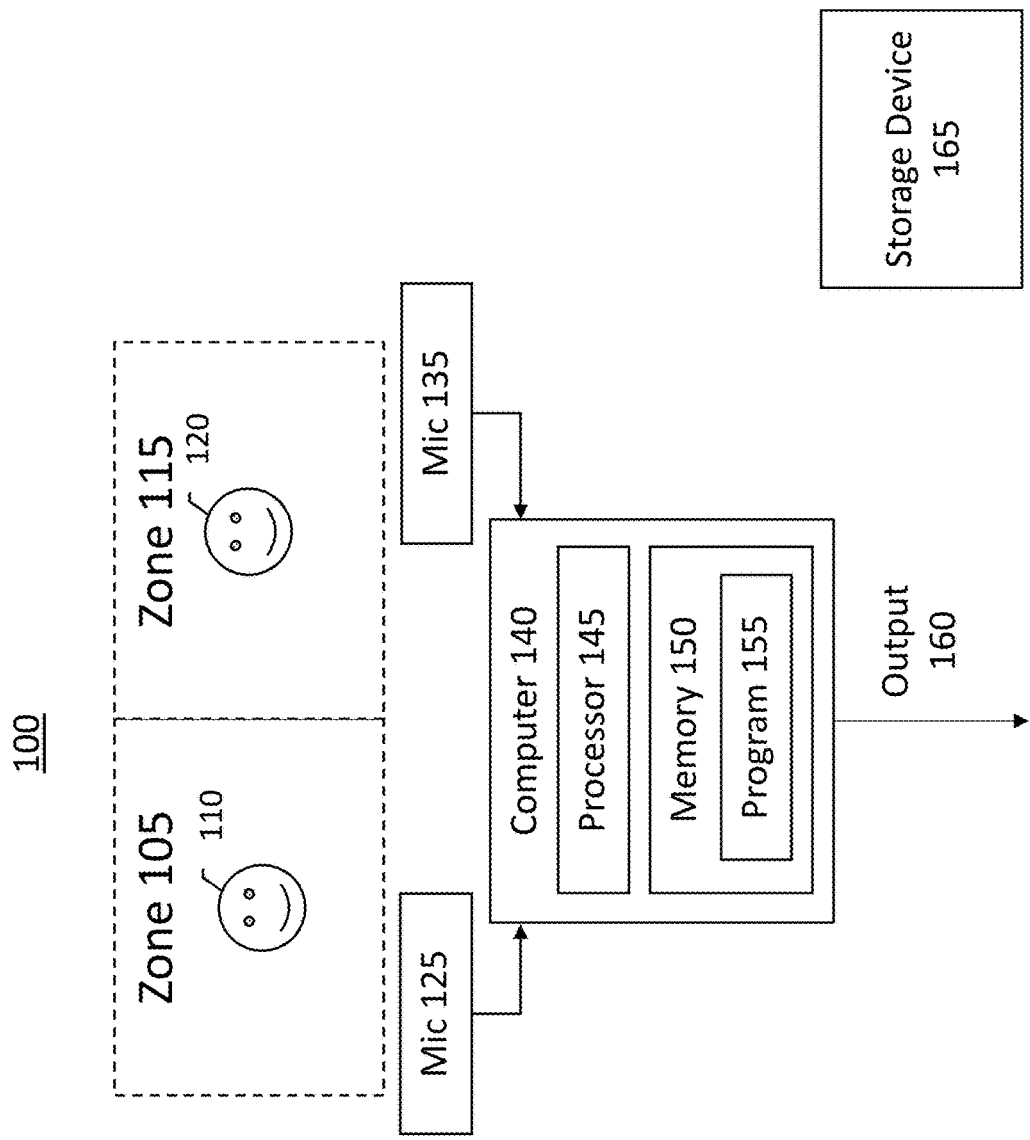
FIG. 1 is block diagram of a multi-microphone speech dialog system.

FIG. 1 is block diagram of a multi-microphone speech dialog system, namely system 100, for multiple spatial zones 105 and 115. System 100 includes microphones 125 and 135, and a computer 140. Computer 140 includes a processor 145 and a memory 150. A user 110 is situated in zone 105, and a user 120 is situated in zone 115.

Microphones 125 and 135 are detectors of audio signals, e.g., speech from users 110 and 120, from zones 105 and 115. Microphone 125 is situated to capture audio from zone 105 at a higher signal level than audio from zone 115, and microphone 135 is situated to capture audio from zone 115 at a higher signal level than from zone 105. In practice, microphone 125 and microphone 135 could be arrays of microphones focused on a particular spatial zone. Microphones 125 and 135 output their respective detected audio signals in the form of electrical signals to computer 140.

Processor 145 is an electronic device configured of logic circuitry that responds to and executes instructions.

Memory 150 is a tangible, non-transitory, computer-readable storage device encoded with a computer program. In this regard, memory 150 stores data and instructions, i.e., program code, that are readable and executable by processor 145 for controlling operation of processor 145. Memory 150 may be implemented in a random access memory (RAM), a hard drive, a read only memory (ROM), or a combination thereof. One of the components of memory 150 is a program module 155.

Program module 155 contains instructions for controlling processor 145 to execute the methods described herein. For example, under control of program module 155, processor 145 will detect and analyze audio signals from zones 105 and 115, and in particular speech from users 110 and 120, and produce an output 160 based on the analysis. For example, in a case where system 100 is employed in an automobile, output 160 could be a signal that controls an air conditioner in the vicinity of user 110 or a seat heater for user 120.

The term "module" is used herein to denote a functional operation that may be embodied either as a stand-alone component or as an integrated configuration of a plurality of subordinate components. Thus, program module 155 may be implemented as a single module or as a plurality of modules that operate in cooperation with one another. Moreover, although program module 155 is described herein as being installed in memory 150, and therefore being implemented in software, it could be implemented in any of hardware (e.g., electronic circuitry), firmware, software, or a combination thereof.

While program module 155 is indicated as being already loaded into memory 150, it may be configured on a storage device 165 for subsequent loading into memory 150. Storage device 165 is a tangible, non-transitory, computer-readable storage device that stores program module 155 thereon. Examples of storage device 165 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random access memory, and (i) an electronic storage device coupled to computer 140 via data communications network (not shown).

System 100 is a multi-zone speech recognition system, which services at least two zones (105 and 115), having at least one microphone (microphones 125 and 135) assigned to each zone. It may be configured with more than two microphones and thereby service more than two zones, for example, one zone per seat in a car (5 zones) or a small bus (7 zones). The term assigned is vital, since this can also be done via a circular or linear microphone array performing beam forming. A microphone array might be located within a specific zone and be assigned to that zone, or it might be placed between zones where it is virtually assigned to more than one zone.

In practice, computer 140 and processor 145 will operate on digital signals. As such, if the signals that computer 140 receives from microphones 125 and 135 are analog signals, computer 140 will include one or more analog-to-digital converter(s) (not shown) to convert the analog signals to digital signals.

System 100 includes a microphone 125, a microphone 135, a processor 145 and a memory 150. Microphone 125 captures first audio from zone 105, and produces a first audio signal. Microphone 135 captures second audio from zone 115, and produces a second audio signal. Processor 145 receives the first audio signal and the second audio signal, and memory 150 contains instructions, i.e., program 155, that control processor 145 to perform operations of:

(a) an SE module that:
  detects, from the first audio signal and the second audio signal, speech activity in at least one of zone 105 or zone 115, thus yielding processed audio; and
  determines from which of the zone 105 or zone 115 the processed audio originated, thus yielding zone activity information;
(b) an ASR module that:
  recognizes an utterance in the processed audio, thus yielding a recognized utterance; and
  based on the zone activity information, produces a zone decision that identifies from which of zone 105 or zone 115 the recognized utterance originated; and
(c) an SD module that:
  performs a zone-dedicated speech dialog based on the recognized utterance and the zone decision.

Additionally, the SD module, based on the recognized utterance and the zone decision, decides from which of zone 105 or zone 115 to obtain additional audio, thus yielding a routing decision. The ASR module, based on the routing decision, obtains the additional audio from either of zone 105 or zone 115, and recognizes an additional utterance in the additional audio.

Figure 2:
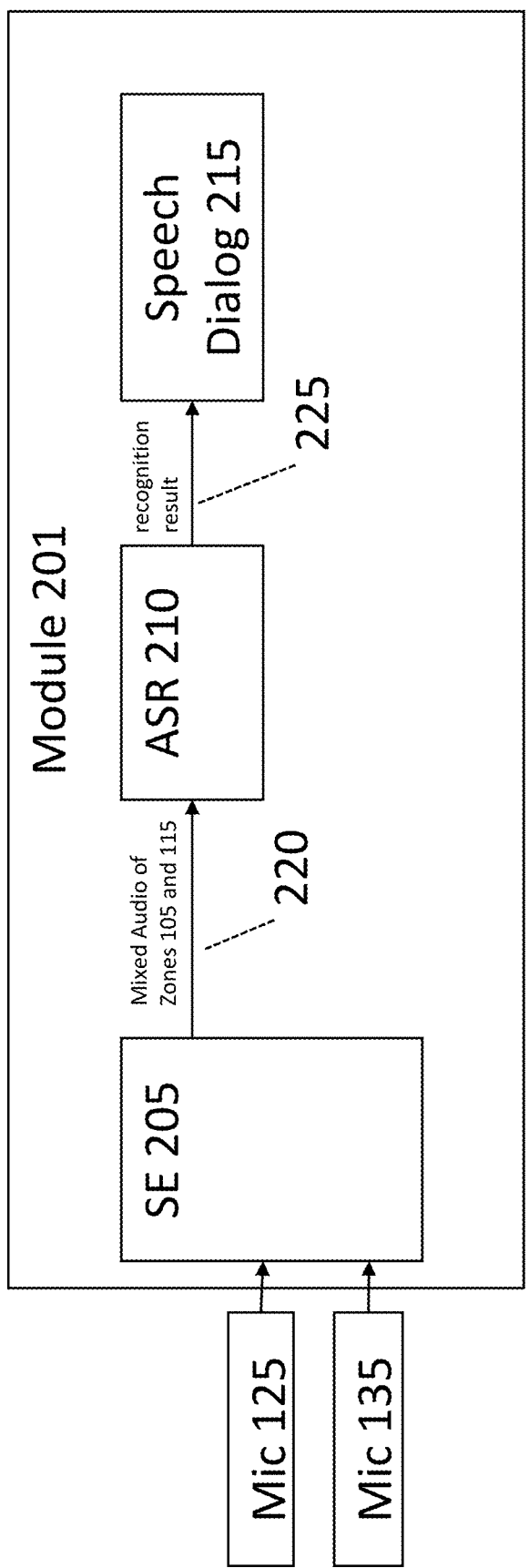
FIG. 2 is a block diagram of a module that may be implemented in the system of FIG. 1.

FIG. 2 is a block diagram of a module 201 that may be implemented in program module 155. Module 201 includes an SE 205, an ASR 210, and a Speech Dialog 215.

SE 205 receives signals from microphones 125 and 135, and produces a signal 220, which includes a mixed audio of signals from zones 105 and 115. Thus, SE 205 is configured to generate one audio data output stream, i.e., signal 220, which is forwarded to ASR 210.

ASR 210 receives signal 220, and produces a recognition result 225. Recognition result 225 may consist of a sequence of words that have been recognized based on signal 220. Recognition result 225 may also contain confidences that refer to each of the recognized words, indicating how certain a word has been recognized. See FIG. 7 and its corresponding description for additional information about ASR 210.

Speech Dialog 215 receives recognition result 225, and triggers further actions. Those can be subsequent recognitions or calls to the surrounding system. Calls to the surrounding system may for instance trigger a navigation system feature, play desired music, control an air conditioner or a seat heater or any other action.

Figure 3:
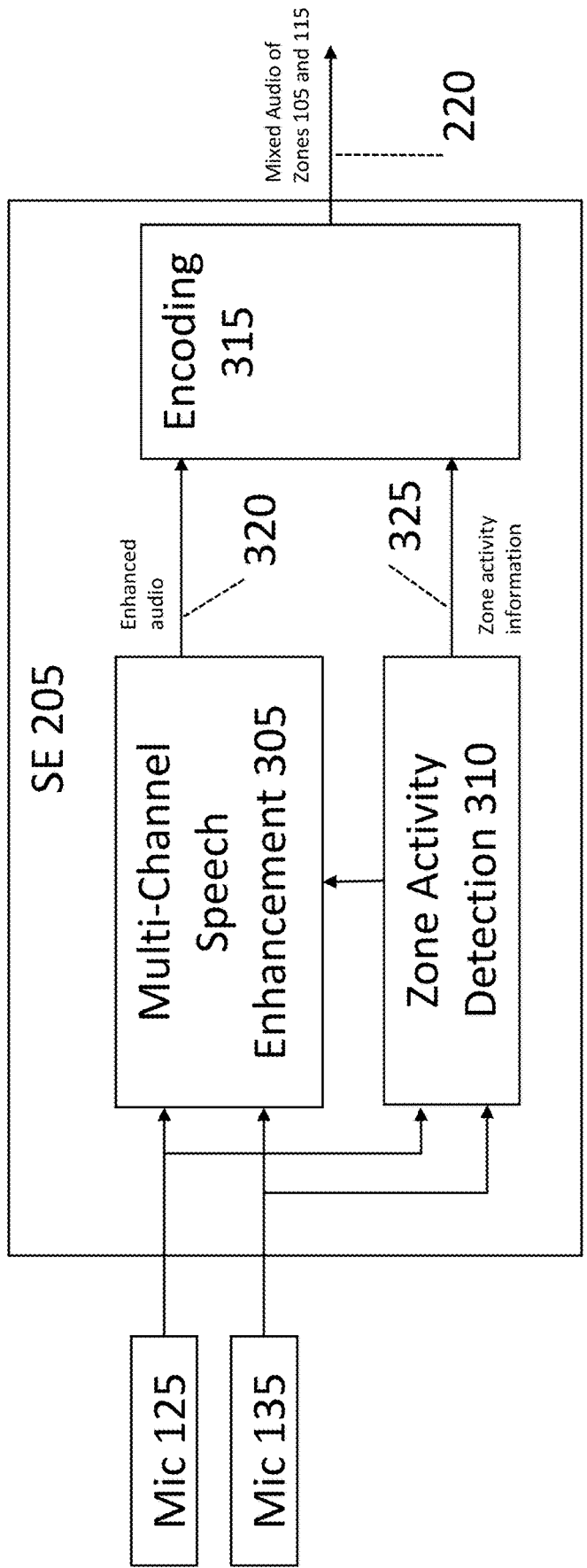
FIG. 3 is a block diagram of an SE that may be implemented in the system of FIG. 1.

FIG. 3 is a block diagram of SE 205. SE 205 includes a Multi-Channel Speech Enhancement 305, a Zone Activity Detection 310, and an Encoding 315.

Multi-Channel Speech Enhancement 305 receives signals from microphones 125 and 135, and produces a signal 320, which is an enhanced audio signal for the purpose of speech recognition. Multi-channel speech enhancement may include acoustic echo cancellation, noise reduction and spatial filtering such as beamforming, speech signal separation or cross-talk cancellation. Multi-Channel Speech Enhancement 305 may include further signal processing techniques such as dereverberation, acoustic speaker localization and speaker tracking, signal mixing, equalization, automatic gain control, or other methods for signal conditioning.

Zone Activity Detection 310 receives signals from microphones 125 and 135, and produces a signal 325. Signal 325 is zone activity information. The zone activity information might consist of several boolean values (i.e., flags), e.g., one flag for each zone. For each point in time (e.g., for each signal block of 16 ms) the value of a flag indicates whether in the corresponding zone a speaker is active (e.g., value 1) or not active (e.g., value 0). Zone activity detection may be accomplished by comparing the signal levels of the audio signals from microphone 125 and microphone 135.

In SE 205, Zone Activity Detection 310 detects speech activity from any of the spatial zones 105, 115, thus providing zone activity information 325 for each time block (typical length of one block is 16 ms). This may also be used to control spatial filtering features in Multi-Channel Speech Enhancement 305.

Encoding 315 receives signals 320 and 325, and produces signal 220. Within Encoding 315, zone activity information 325 is combined with the processed signal 320. The zone activity information 325 added to the processed signal 320 is referred to as meta data as it is additional data. Thus, encoding 315 combines signal 325, i.e., zone activity information, with signal 320, i.e., enhanced audio, to produce signal 220, which contains audio data and meta data.

Alternatively to the zone activity information 325, the meta data could also comprise other information that might be calculated within the signal processing performed by multi-channel speech enhancement 305, such as speech activity information. The resulting output. i.e., signal 220, is sent to ASR 210 on a block-by-block basis. Thus, signal 220 is the processed audio signal combined with zone activity detection, and is provided in blocks. There are different options how to encode the meta data:

(a) The zone activity information (325) can be represented by a single index that specifies the spatial zone (105 or 115) that is currently being detected by the zone activity detector (310).
(b) It can be sent by a bit mask where each bit corresponds to one spatial zone (105 or 115). The bits set in the mask correspond to those spatial zones that show speech activity for a current time block. The bit mask has the advantage that simultaneous speech activity in different spatial zones (105 and 115) can be handled (multi-talk).

(c) The meta data can be sent by additional data which is attached to each block of an audio output signal.

(d) The meta data can be encoded (inaudibly) into the audio signal.

(e) The zone activity information can be sent together with other meta data, e.g., meta data that describe speech activity in general.

Figure 4:
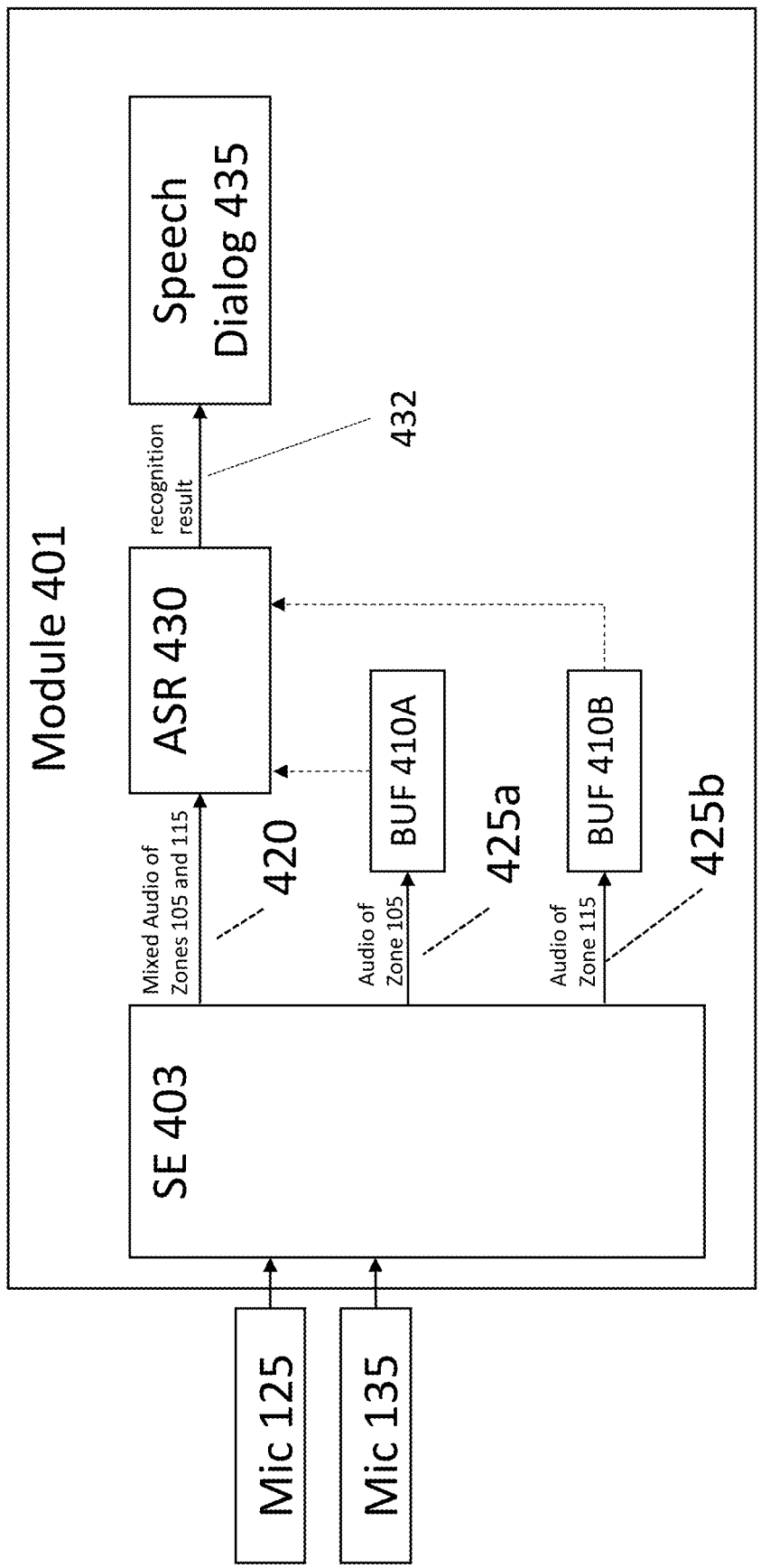
FIG. 4 is a block diagram of a module that may be implemented in the system of FIG. 1.

FIG. 4 is a block diagram of a module 401 that may be implemented in program module 155. Module 401 includes an SE 403, an ASR 430, a Speech Dialog 435, a buffer 410A and a buffer 410B.

SE 403 receives signals from microphones 125 and 135, and produces signals 420, 425a and 425b. Signal 420 is mixed audio of zones 105 and 115. Signal 425a is audio of zone 105. Signal 425b is audio of zone 115. Note that in contrast to SE 205, which generates one audio stream, i.e., signal 220, SE 403 generates three audio data output streams, i.e., signals 420, 425a and 425b. See FIG. 6 and its corresponding description for additional information about SE 403.

Buffer 410A receives and buffers, i.e., stores, signal 425a, i.e., audio of zone 105. Buffer 410B receives and buffers, i.e., stores, signal 425b, i.e., audio of zone 115. Outputs from buffers 410A and 410B can be dynamically selected and routed to ASR 430. More specifically, depending on recognition result 432, speech dialog 435 might select one of the outputs from buffers 410A and 410B, and set the routing to ASR 430 accordingly. Because of this dynamic selection, in FIG. 4, the outputs from buffers 410A and 410B are represented in dashed lines. Each of buffers 410A and 410B is a ring buffer that can hold a configurable amount of data to allow a look-back in time, e.g., for a period of a few seconds, for example, in a range of about one to four seconds. However, the look-back period can be any desired duration of time. To look back in time means to process audio data from zone 105 and/or zone 115 that occurred sometime in the past.

ASR 430 receives signal 420, and, alternatively, under some circumstances the outputs from buffers 410A or 410B, and produces recognition result 432. Whereas ASR 430 can obtain data from buffers 410A and 410B, ASR 430 does not need to include an internal buffer for such data. Thus, SE 403 provides multiple output signals (420, 425a, 425b) in parallel, which are all ultimately, under appropriate circumstances, routed to ASR 430. See FIGS. 7 and 9 and their corresponding descriptions for additional information about ASR 430.

Speech Dialog 435 receives recognition result 432. The operation of Speech Dialog 435 is similar to that of Speech Dialog 215.

After activating the system by speech, e.g., via a WuW, which has been done on the broad listening signal, i.e., signal 420, speech dialog 435 continues on the relevant one of the selective listening output signals, i.e., signal 425a or 425b. ASR 430 uses the signal from that signal look-back buffer (410a or 410b) related to the desired spatial zone (105 or 115) and looks back in time to the position that is related to the end of the speech activation, e.g., WuW utterance. Thus, a smooth transition between activation and the succeeding speech dialog is achieved.

Thus, in module 401, buffer 410A stores a most-recent several seconds of a first audio signal, thus yielding buffered first audio, and buffer 410B stores a most-recent several seconds a second audio signal, thus yielding buffered second audio. ASR 430 obtains additional audio by accessing either of the buffered first audio or the buffered second audio, based on a routing decision that is provided by speech dialog 435.

Figure 5:
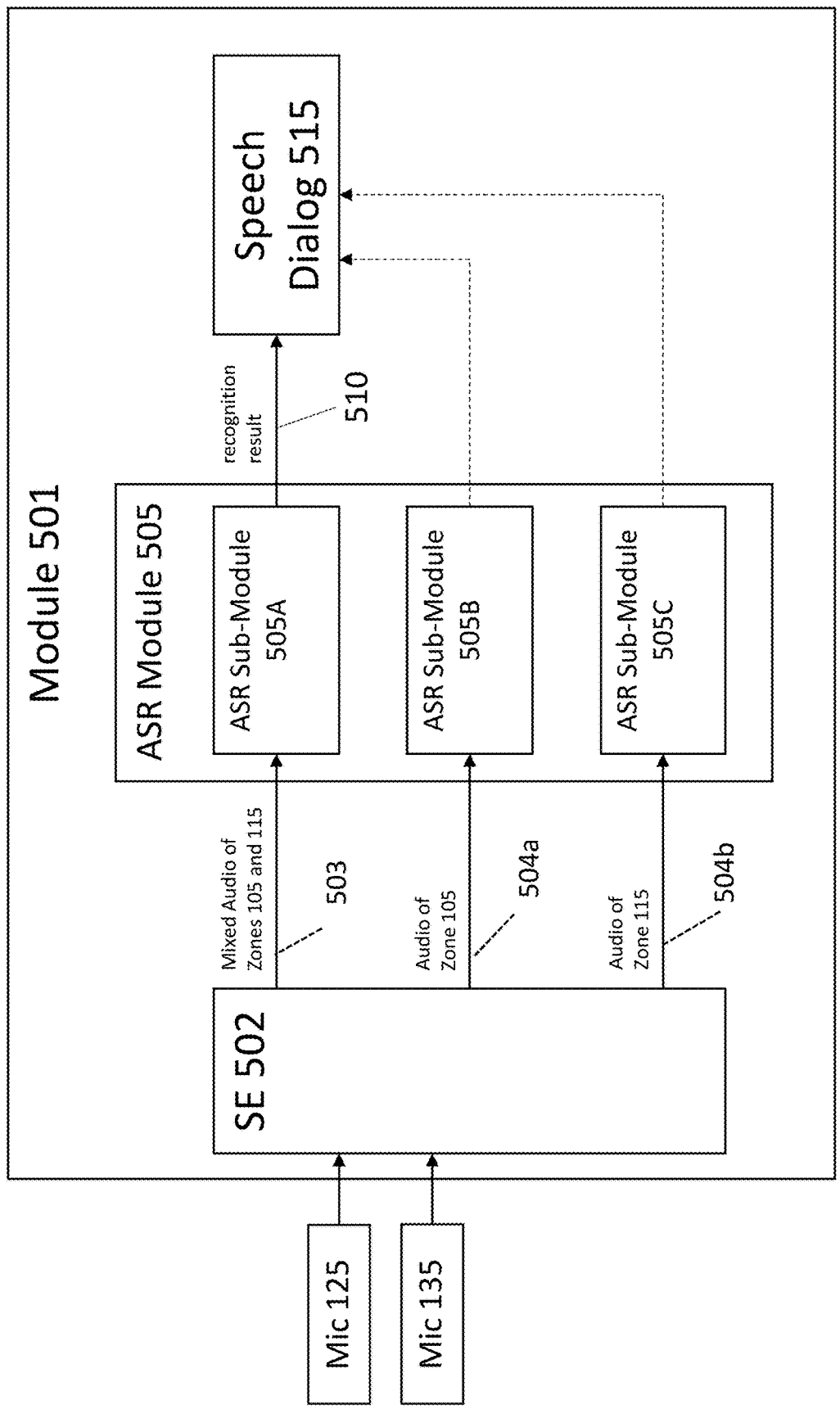
FIG. 5 is a block diagram of a module that may be implemented in the system of FIG. 1.

FIG. 5 is a block diagram of a module 501 that may be implemented in program module 155. Module 501 includes an SE 502, an ASR module 505, and a Speech Dialog 515. ASR module 505, in turn, includes ASR sub-modules 505A, 505B and 505C SE 502 is functionally similar to SE 403. SE 502 receives signals from microphones 125 and 135, and produces signals 503, 504a and 504b. Signal 503 is mixed audio of zones 105 and 115, for broad listening. Signal 504a is audio of zone 105, for selective listening of zone 105. Signal 504b is audio of zone 115, for selective listening of zone 115. See FIG. 6 and its corresponding description for additional information about SE 502.

ASR sub-module 505A receives signal 503, i.e., the mixed audio of zones 105 and 115, and processes signal 503 for the purpose of detecting an occurrence of a WuW. ASR sub-module 505A uses the audio part of signal 503 for the purpose of speech recognition, and the meta data part of signal 503 for deciding on the zone associated to the WuW. As a result, ASR sub-module 505A provides a recognition result 510 to speech dialog 515. Recognition result 510 contains the WuW detection result and the zone decision result, i.e., information concerning which zone is associates with the WuW. See FIG. 10 and its corresponding description for additional information about ASR submodule 505A.

ASR sub-module 505B receives signal 504a, i.e., the audio of zone 105, and processes signal 504a for the purpose of detecting speech in zone 105, after the occurrence of the WuW. ASR sub-module 505B includes an internal buffer for buffering data. ASR sub-module 505B can use the buffer to look back in time, for instance, to the end of an utterance, and perform the recognition process on data that occurred at some time in the past. ASR sub-module 505B uses the audio part of signal 504a for purpose of speech recognition. ASR sub-module 505B might use the meta data part of signal 504a to confirm that the word sequence that results from the recognition process can be associated with user 110 who is located in zone 105. See FIG. 10 and its corresponding description for additional information about ASR sub-module 505B.

ASR sub-module 505C receives signal 504b, i.e., the audio of zone 115, and processes signal 504b for the purpose of detecting speech in zone 115, after the occurrence of the WuW. ASR sub-module 505C includes an internal buffer for buffering data. ASR sub-module 505C can use the buffer to look back in time, for instance, to the end of an utterance, and perform the recognition process on data that occurred at some time in the past. ASR sub-module 505C uses the audio part of signal 504b for purpose of speech recognition. ASR sub-module 505C might use the meta data part of signal 504b to confirm that the word sequence that results from the recognition process can be associated with user 120 who is located in zone 115. See FIG. 11 and its corresponding description for additional information about ASR sub-module 505C.

Depending on the recognition result 510 the speech dialog 515 might select one of the outputs from ASR sub-module 505B or 505C to proceed with the further dialog steps and set the routing to speech dialog 515 accordingly. Because of this dynamic selection, in FIG. 5, the outputs from ASR sub-module 505B and 505C are represented in dashed lines.

Speech Dialog 515 receives recognition result 510. The operation of Speech Dialog 515 is similar to that of Speech Dialog 215.

In module 501, differently from prior art, (a) SE 502 has a broad listening output signal, i.e., signal 503, in addition to selective listening output signals, i.e., signals 504a and 504b, and (b) at each point in time, only one of ASR sub-modules 505A, 505B or 505C is fully active, and any other ASR instance operates in a low-CPU mode.

Figure 6:
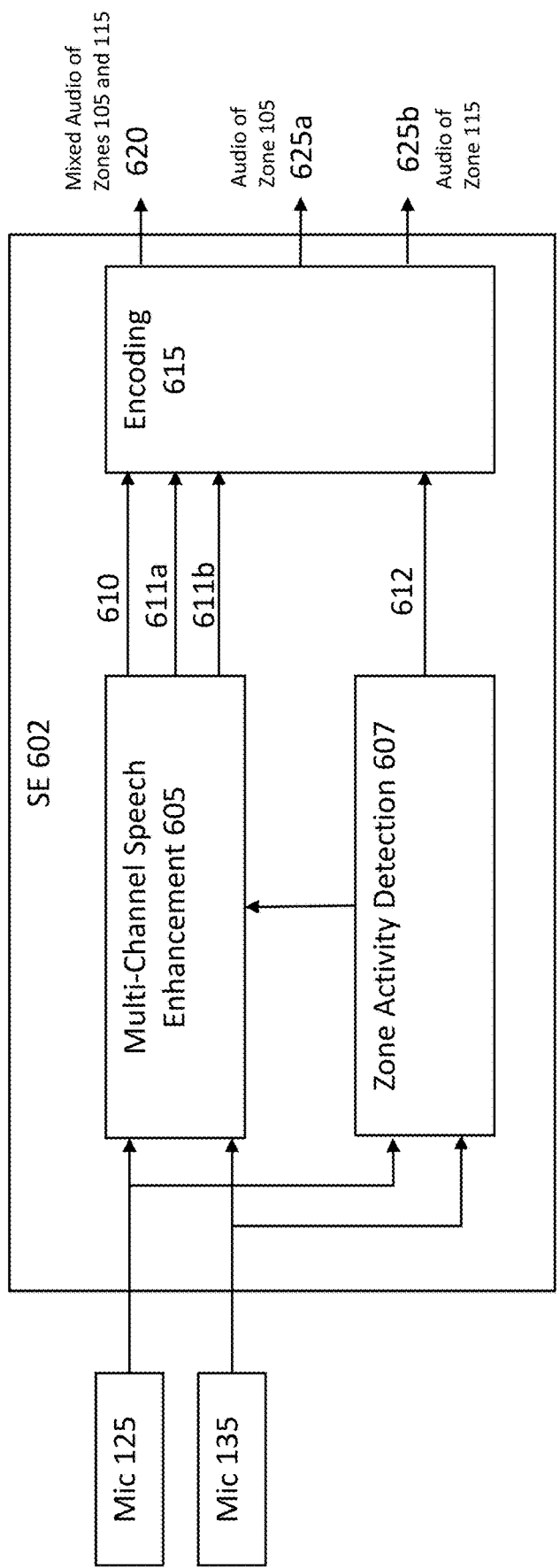
FIG. 6 is a block diagram of an SE that may be implemented in the system of FIG. 1.

FIG. 6 is a block diagram of an SE 602 that may be implemented in program module 155, and as mentioned above, may be used to provide the functionality of either of SE 403 or SE 502. SE 602 includes a Multi-Channel Speech Enhancement 605, a Zone Activity Detection 607, and an Encoding 615.

Multi-Channel Speech Enhancement 605 receives signals from microphones 125 and 135, and produces signals 610, 611a and 611b. Signal 610 is mixed audio of zones 105 and 115. Signals 611a and 611b are audio from zones 105 and 115, respectively.

Multi-Channel Speech Enhancement 605 performs spatial filtering which is focused on one zone by means of, for example, beamforming or source signal separation. Multi-Channel Speech Enhancement 605 might include further signal processing techniques such as dereverberation, acoustic speaker localization and speaker tracking, signal mixing, equalization, automatic gain control, or other methods for signal conditioning. Signal 610, i.e., the mixed audio of zones 105 and 115, is generated in a broad listening mode, and signals 611a and 611b, i.e., audio from zones 105 and 115, respectively, are generated in selective listening mode. Thus, the selective listening signals (611a, 611b) have a spatial focus on the different spatial zones (105, 115).

Zone Activity Detection 607 receives signals from microphones 125 and 135, and produces a signal 612. Signal 612 is zone activity information. Operations of Zone Activity Detection 607 are similar to those of Zone Activity Detection 310.

Encoding 615 receives signals 610, 611a, 611b and 612. Encoding 615 combines each of the signals 610, 611a and 611b with the zone activity information 612. Encoding 615 outputs signals 620, 625a and 625b. Signal 620 is mixed audio of zones 105 and 115 combined with the zone activity information 612. Signal 625a is audio of zone 105 combined with the zone activity information 612. Signal 625b is audio of zone 115 combined with the zone activity information 612.

Thus, ASR module 505 is configured of ASR sub-modules 505A, 505B and 505C. SE 502 provides (a) to ASR sub-module 505A, a data stream comprising audio from a first spatial zone and a second spatial zone, (b) to ASR sub-module 505B, a data stream of audio from the first spatial zone, and (c) to ASR sub-module 505C, a data stream of audio from the second spatial zone. ASR sub-module 505A, during the broad listening mode, is enabled to receive and evaluate a mixed audio signal that includes audio from the first spatial zone, and audio from the second spatial zone. Processor 145 switches from broad listening mode to selective listening mode in response to ASR sub-module 505A recognizing an utterance. ASR sub-module 505B, during a selective listening mode for evaluating audio from the first spatial zone, is enabled to receive and evaluate additional audio from the first spatial zone. ASR sub-module 505C, during a selective listening mode for evaluating audio from the second spatial zone, is enabled to receive and evaluate additional audio from the second spatial zone.

Figure 7:
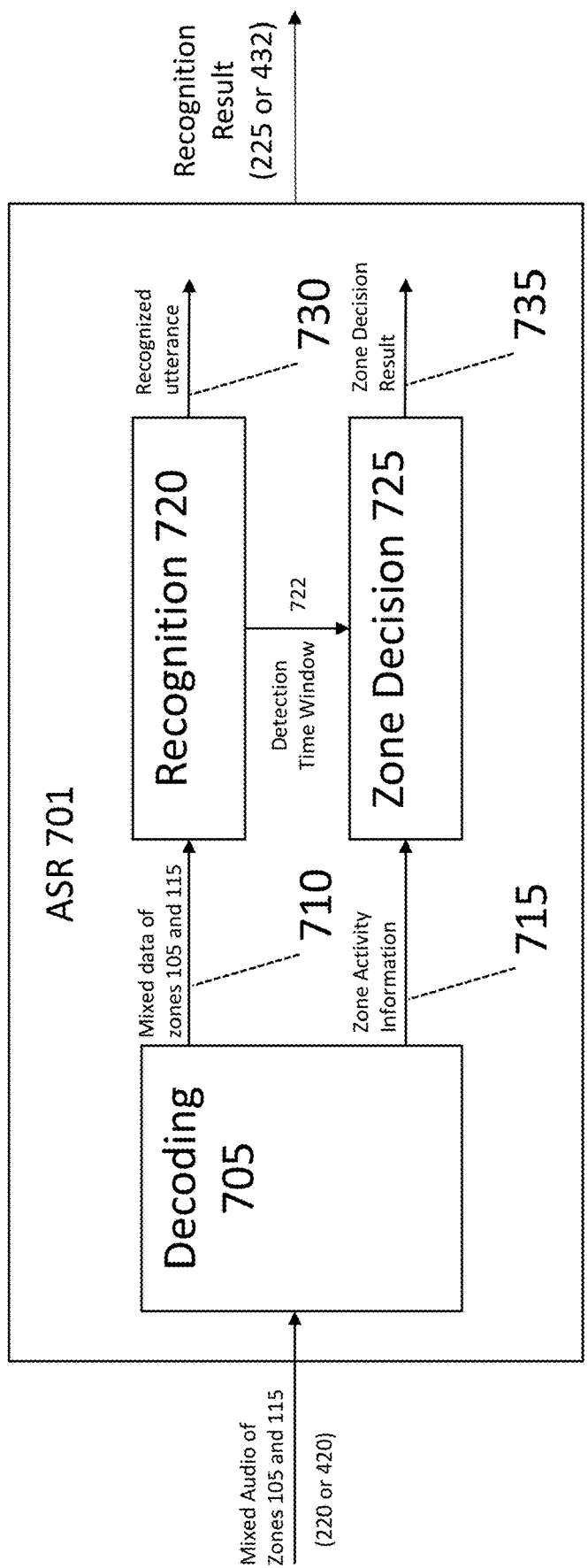
FIG. 7 is a block diagram of an ASR that may be implemented in the system of FIG. 1.

FIG. 7 is a block diagram of an ASR 701 that may be used to implement either of (a) ASR 210, or (b) ASR 430 in broad listening mode.

ASR 701 includes a Decoding 705, a Recognition 720, and a Zone Decision 725.

Decoding 705 receives the mixed audio of zones 105 and 115, e.g., either signal 220 or 420, separates audio data from zone activity information, and produces a signal 710 and a signal 715. Signal 710 is mixed audio data of zones 105 and 115. Signal 715 is zone activity information.

Recognition 720 receives signal 710, i.e., in case of broad listening mixed data of zones 105 and 115, and performs speech recognition, e.g., for the purpose of WuW recognition. The recognition produces a recognized utterance 730, i.e., a sequence of words that have been recognized based on data in signal 710. Corresponding to the recognized utterance, the recognizer determines the start and the end time of the utterance. Thus, recognition 720 produces a detection time window 722. Detection time window 722 might be related to a complete utterance or to parts of an utterance, and might be represented by a start time and an end time of the utterance.

Zone decision 725 receives zone activity information 715 and detection time window 722, and determines which of zones 110 or 115 is relevant and was most active during the defined time window. As a result, it provides a zone decision result 735. Zone decision result 735 might be an index or an identifier that has been assigned to each of the zones, e.g., index 1 for zone 110 or index 2 for zone 115. See FIG. 8 and its corresponding description for additional information about zone decision 725.

ASR 701 produces a recognition result, e.g., signal 225 or signal 432. The recognition result contains the recognized utterance 730 and the zone decision result 735. The recognition result might contain further information such as confidence values that have been determined within the recognition 720.

Thus, ASR 701 determines the relevant spatial zone (105 or 115) on a time scale that is long enough to include a word or an utterance, and provides the recognition result (225 or 432) that includes information that identifies the spatial zone to which the word or utterance is related.

Figure 8:
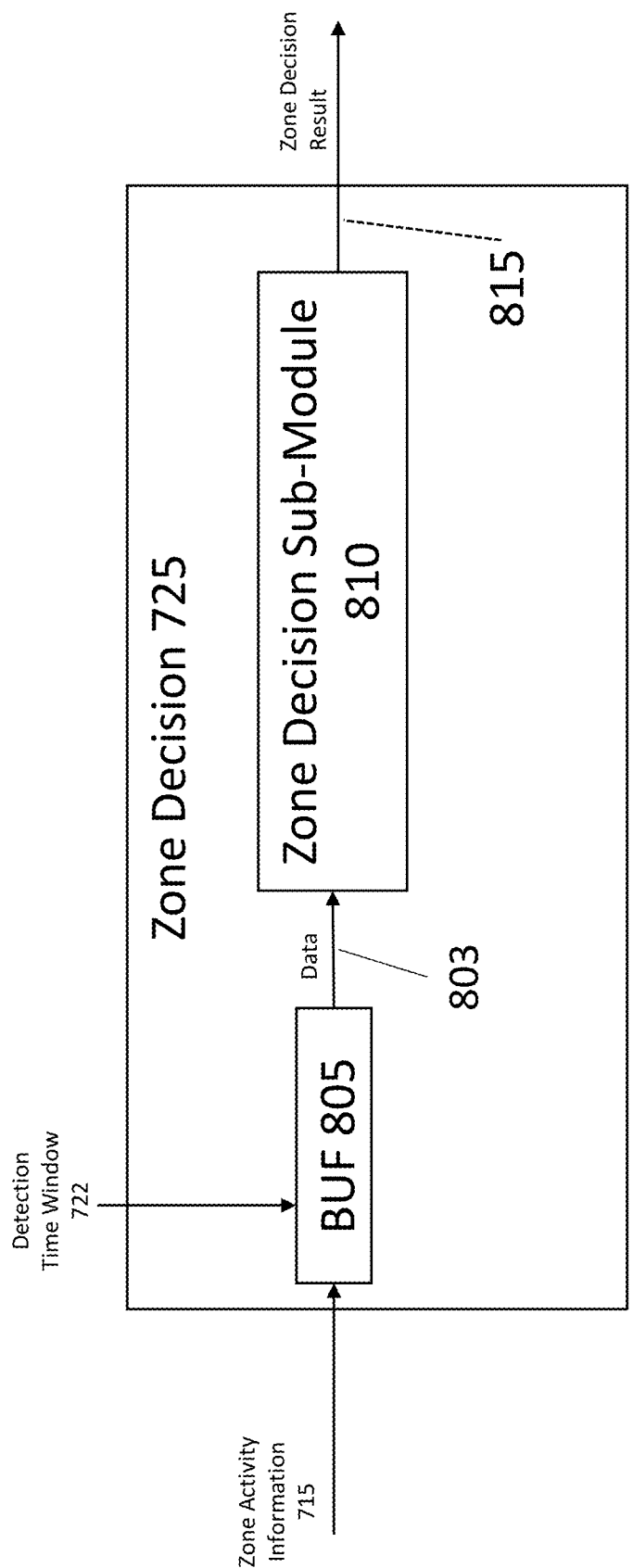
FIG. 8 is a block diagram of a zone decision module that may be implemented in the system of FIG. 1.

FIG. 8 is a block diagram of zone decision 725, which includes a buffer 805 and a zone decision sub-module 810.

Buffer 805 is a ring buffer that receives zone activity information 715 and detection time window 722, and produces data 803. In contrast to buffers 410A and 410B, buffer 805 does not buffer audio data. Data 803 refers to that temporal section of zone activity information 715 that corresponds to the time span that is specified by detection time window 722. Zone activity information 715 is buffered in buffer 805 to enable a look-back in time, e.g., for a period of a few seconds. In response to an external trigger defining the time window, i.e., signal 722, zone decision sub-module 810 starts working on a subset of buffered data in buffer 805 defined by the time window. Zone decision sub-module 810 determines which of zones 110 or 115 is relevant and was most active during the defined time window.

Data in buffer 805 can be evaluated for time segments in the past for each recognition result (e.g., 225 or 432) on exactly the time window that corresponds to the occurrence of a related utterance. Thus, zone decision 725 can decide which spatial zone (105 or 115) has shown speech activity during the duration of a spoken utterance.

The evaluation of data in buffer 805 might be performed only for specific words in the grammar, e.g., a WuW, or special steps in the speech dialog, e.g., Speech Dialog 215. There might be special steps within the speech dialog that require the knowledge of the speaker position, e.g., for user 110 or 120 controlling the strength of their seat heater by a speech command it is required to know in which zone the user is located, i.e., which seat is addressed.

The evaluation of data in buffer 805 results in a zone decision result 815. This might comprise an index of a spatial zone (105 or 115), which has been detected as the most active spatial zone, and a confidence value that indicates how certain this spatial zone (105 or 115) has been detected.

Zone decision sub-module 810, when evaluating data from buffer 805, i.e., data 803, within the time window might do one or more of:
(a) exploit statistics of zone activity information 715 that is calculated within the relevant time window;
(b) consider multi-talk situations that might be indicated by zone activity information 715;
(c) be based on the statistics of zone activity information 715, consideration of multi-talk situations, the ratio of blocks without any speech activity within the time window relative to the total length of the time window, etc.;
(d) determine a zone confidence that indicates a probability of a correct decision on this spatial zone (105 or 115);
(e) include ASR internal information such as the voice activity detection within the ASR, or other metrics that are accessible on a block level; or
(f) include external information such as visual information from a camera.

Thus, in zone decision 725, zone activity information 715 is buffered in buffer 805, thus yielding buffered zone activity information, which is processed on a section thereof, i.e., data 803, that is given by detection time window 722.

Figure 9:
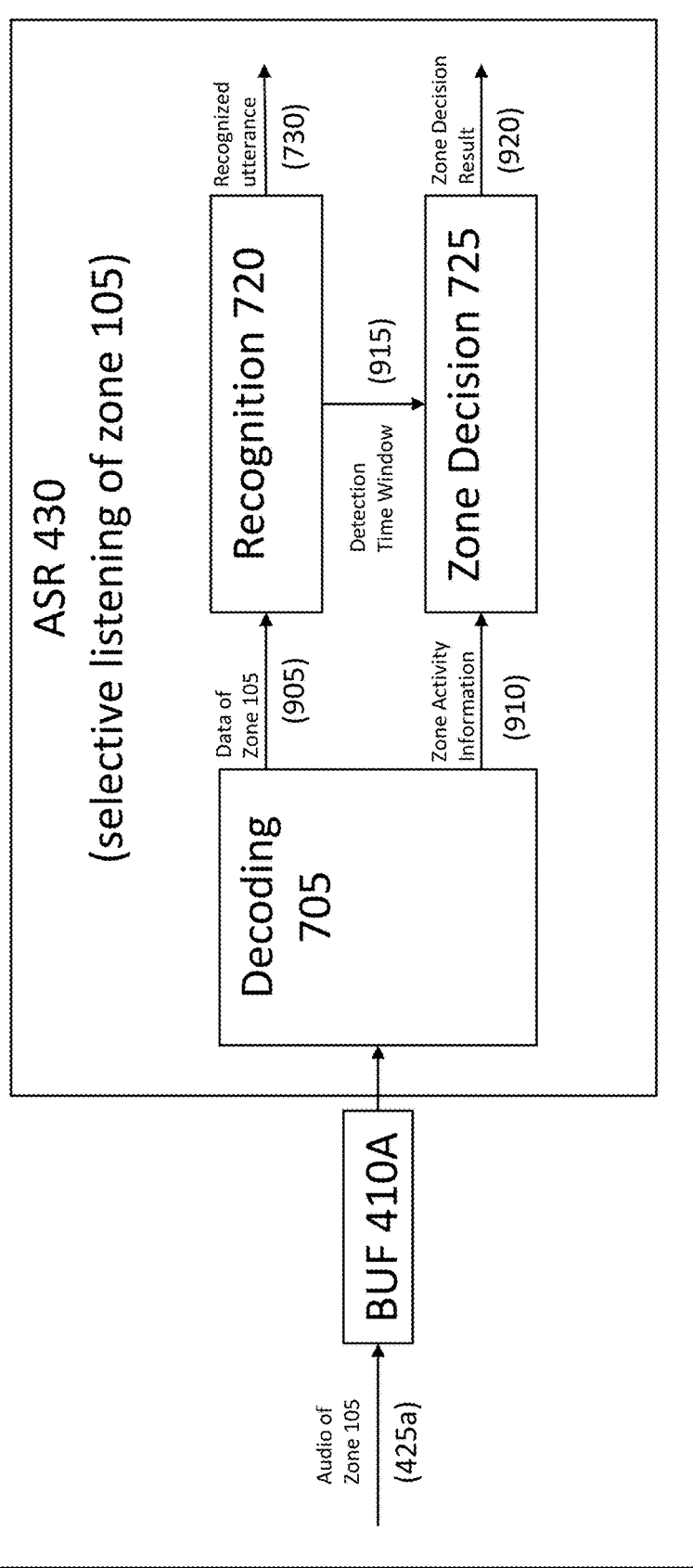
FIG. 9 is a block diagram of a portion of the module of FIG. 4, showing an example of an operation of an ASR after dynamic selection of a spatial zone.

FIG. 9 is a block diagram of a portion of module 401, showing an example of the operation of ASR 430 after dynamic selection of a zone, and more specifically, during selective listening of audio from zone 105. The operation of ASR 430 in this example is similar to that of ASR 701, shown in FIG. 7.

In the example in FIG. 9, decoding 705 receives buffered, i.e., time-delayed, audio of zone 105 from buffer 410A, separates audio data from zone activity information, and produces a signal 905 and a signal 910. Signal 905 is data of zone 105. Signal 910 is zone activity information. Recognition 720 receives signal 905, produces a detection time window 915 and a recognized utterance 730, i.e., a sequence of words that have been recognized based on data in signal 905. Zone decision 725 receives zone activity information 910 and detection time window 915, and produces a zone decision result 920. The zone decision result 920 might comprise an index of a spatial zone (105), which has been detected, and a confidence value that indicates how certain this spatial zone (105) has been detected. This information is of special interest in scenarios with an interfering speaker talking while selective listening is focusing on another speaker.

Figure 10:
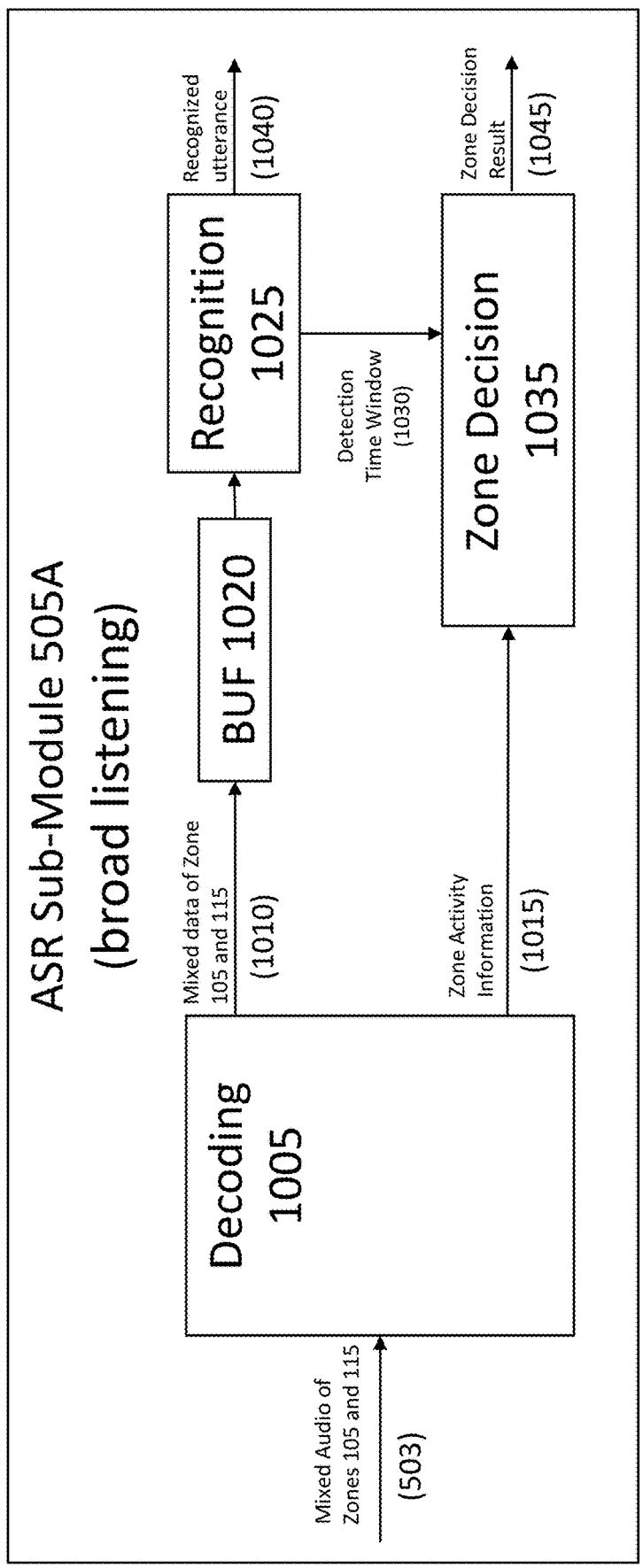
FIG. 10 is a block diagram of ASR sub-module operating in a broad listening mode.

FIG. 10 is a block diagram of ASR sub-module 505A. ASR sub-module 505A includes a decoding 1005, a buffer 1020, a recognition 1025, and a zone decision 1035. Operations of decoding 1005, recognition 1025, and zone decision 1035 are similar to those of Decoding 705, Recognition 720, and Zone Decision 725, respectively.

Decoding 1005 receives signal 503, i.e., mixed audio of zones 105 and 115, separates audio data from zone activity information, and produces a signal 1010 and a signal 1015. Signal 1010 is mixed audio data of zones 105 and 115. Signal 1015 is zone activity information.

Buffer 1020 receives signal 1010, i.e., mixed audio data of zones 105 and 115. Buffer 1020 is a ring buffer that stores a configurable amount of data to allow a look-back in time, e.g., for a period of a few seconds.

Recognition 1025 receives buffered, i.e., time-delayed, data from buffer 1020, produces a detection time window 1030 and a recognized utterance 1040, i.e., a sequence of words that have been recognized based on data in signal 1010.

Zone decision 1035 receives zone activity information 1015 and detection time window 1030, and determines which of zones 110 or 115 is relevant and was most active during the defined time window. Zone detection 1035 produces a zone detection result 1045.

ASR sub-module 505A can buffer internally in a more efficient way, which speeds up recognition time if doing a recognition at data from the past.

Figure 11:
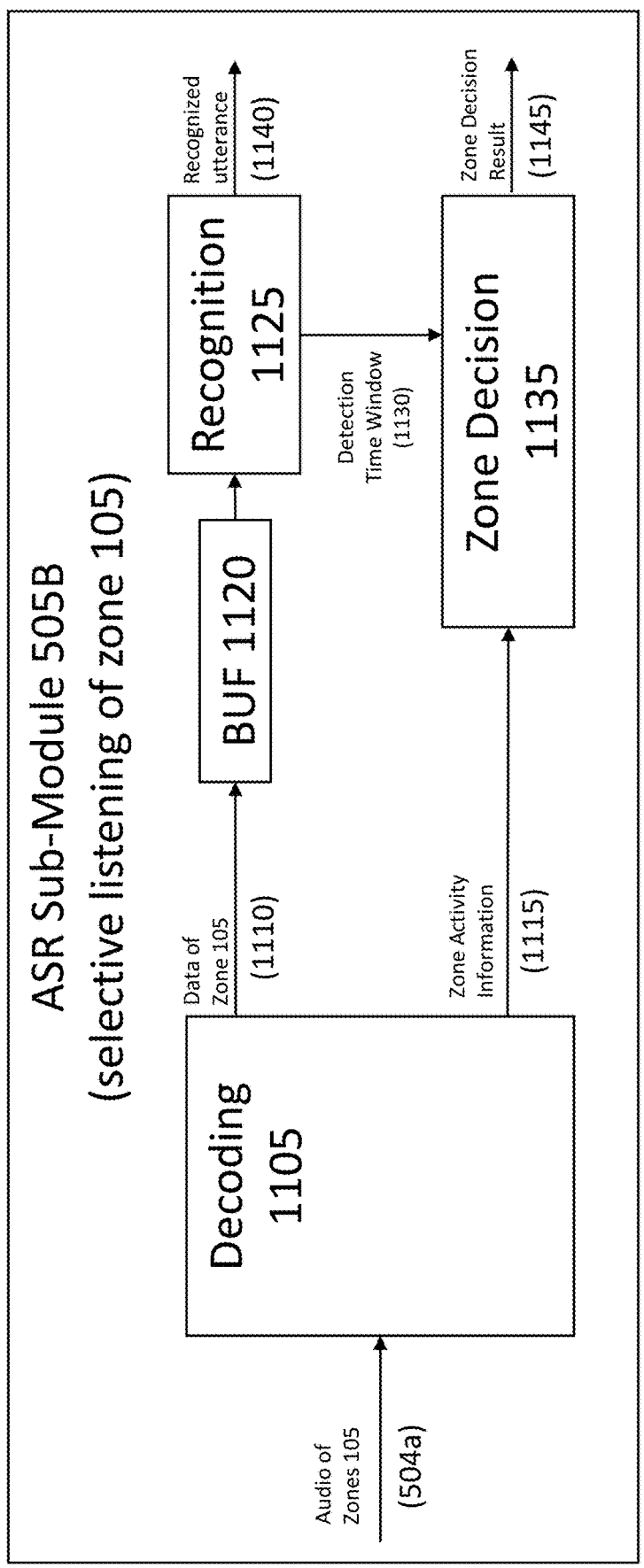
FIG. 11 is a block diagram of ASR sub-module operating in a selective listening mode.

FIG. 11 is a block diagram of ASR sub-module 505B. ASR sub-module 505B includes a decoding 1105, a buffer 1120, a recognition 1125, and a zone decision 1135. Operations of decoding 1105, recognition 1125, and zone decision 1135 are similar to those of Decoding 705, Recognition 720, and Zone Decision 725.

Decoding 1105 receives signal 504a, i.e., audio of zone 105, separates audio data from zone activity information, and produces a signal 1110 and a signal 1115. Signal 1110 is data of zone 105. Signal 1115 is zone activity information.

Buffer 1120 receives signal 1110, i.e., data of zone 105. Buffer 1120 is a ring buffer that stores a configurable amount of data to allow a look-back in time, e.g., for a period of a few seconds.

Recognition 1125 receives buffered, i.e., time-delayed, data from buffer 1120, produces a detection time window 1130 and a recognized utterance 1140, i.e., a sequence of words that have been recognized based on the input data 1110.

Zone decision 1135 receives zone activity information 1115 and detection time window 1130, and produces a zone decision result 1145. Zone decision result 1145 might comprise an index of a spatial zone (105), which has been detected, and a confidence value that indicates how certain this spatial zone (105) has been detected. This information is of special interest in scenarios with an interfering speaker talking while selective listening is focusing on another speaker.

Like ASR 505A, ASR sub-modules 505B and 505C can buffer internally in a more efficient way, which speeds up recognition time if doing a recognition at data from the past. ASR sub-module 505B obtains signal 504a for selective listening related to zone 105, and ASR sub-module 505C obtains signal 504b for selective listening related to zone 115. As described with FIG. 5, speech dialog 515 dynamically selects one out of the ASR sub-modules 505A, 505B, and 505C from which to receive the recognition result. As the buffering of data happens within the ASR sub-modules, a flexible solution can be realized.

Figure 12:
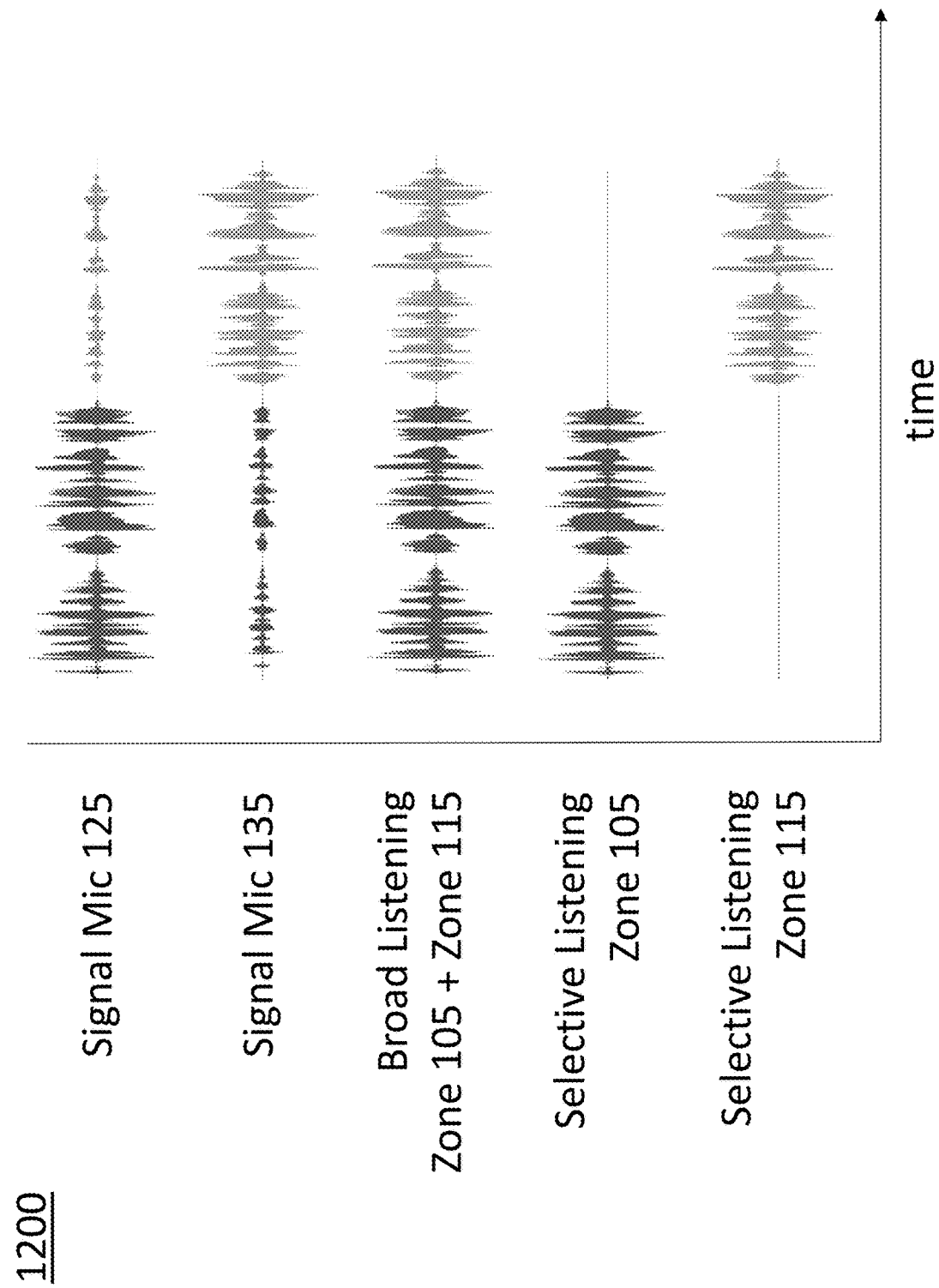
FIG. 12 is a graph that shows temporal relationships between several signals in the system of FIG. 1.

FIG. 12 is a graph 1200 that shows temporal relationships between several signals in system 100. The horizontal axis is time. The vertical axis identifies the signals as:
(a) a signal from microphone 125;
(b) a signal from microphone 135;
(c) signals from zones 105 and 115, during broad listening;
(d) a signal from zone 105, during selective listening; and
(e) a signal from zone 115, during selective listening.

Referring again to FIGS. 4 and 5, modules 401 and 501 employ parallel SE outputs for broad listening and selective listening for a quantity of N spatial zones, i.e., where N is the number of spatial zones. In this regard, in system 100, where N=2, SE 403 provides multiple (N+1) output signals (420, 425a, 425b), and SE 502 provides multiple (N+1) output signals (503, 504a and 504b). Some of the signals (425a, 425b, 504a, 504b) refer to selective listening for one of the N spatial zones (105, 115), and additionally provides one output signal (420, 503) for broad listening. The broad listening output signal (420, 503) is connected to one instance of the ASR (430, 505A) that is configured to detect a WuW.

In module 401, the selective listening output signals (425a, 425b) are connected to buffers (410A and 410B), and when appropriate, are routed to ASR 430. As broad (420) and selective (425a, 425b) listening output signals are emitted permanently by SE 403, some signals can be buffered. Delays and latencies after WuW detection can be compensated by looking back in the buffers (410a and 410b) to the relevant position in time to continue with speech dialog 435 in selective listening mode. The relevant signal (420 or 425a or 425b) is dynamically routed to ASR 430, and data in the relevant signal look-back buffer (410a or 410b) is accessed at a relevant temporal position.

In Module 501, the selective listening output signals (504a, 504b) are each connected to a dedicated instance of the ASR (505B, 505C) (for potential speech dialog). The selective-listening ASR instances (505B, 505C) will operate in a CPU-saving mode during the WuW listening phase. Upon detection of a WuW one ASR instance (505B or 505C) related to the relevant spatial zone (105 or 115) may be fully activated.

Advantages of module 501 include (a) simplified complexity for control (switching between broad- and selective listening mode) on framework application level, and (b) low CPU load due to just one instance of the ASR component (410) running at each point in time. An increased possibility of WuW detection by broad-listening is realized, combined with the advantages of multiple spatially focused SE based on selective listening. Increased efficiency results by applying only one instance of the ASR component in the WuW phase without performance degradation compared to a setup where multiple instances of the ASR component are active at the same time.

Hence, both of modules 401 and 501 advantageously provide sequential broad/selective listening, and module 501 provides a further advantage of multiple ASRs.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A speech dialog system comprising:
a first microphone that captures first audio from a first spatial zone, and produces a first audio signal;
a second microphone that captures second audio from a second spatial zone, and produces a second audio signal;
a processor that receives said first audio signal and said second audio signal; and
a memory that contains instructions that control said processor to perform operations of:
(a) a speech enhancement (SE) module that:
detects and enhances, from said first audio signal and said second audio signal, speech activity in at least one of said first spatial zone or said second spatial zone, thus yielding enhanced processed audio; and
determines from which of said first zone or said second zone said enhanced processed audio originated, thus yielding zone activity information, wherein the zone activity information includes, for each signal block of a predetermined amount of time, a first flag for the first spatial zone and a second flag for the second spatial zone indicating whether a respective speaker in the first zone or the second zone is active, and wherein the enhanced processed audio is combined with the first flag for the first spatial zone and the second flag for the second spatial zone of the zone activity information;
(b) an automatic speech recognition (ASR) module that:
recognizes an utterance in said enhanced processed audio, thus yielding a recognized utterance; and
based on said zone activity information combined with the enhanced processed audio, produces a zone decision that identifies from which of said first zone or said second zone said recognized utterance originated; and
(c) a speech dialog (SD) module that:
performs a zone-dedicated speech dialog based on said recognized utterance and said zone decision.

2. The system of claim 1, wherein said SD module, based on said recognized utterance and said zone decision, decides from which of said first zone or said second zone to obtain additional audio, thus yielding a routing decision;
wherein said ASR module:
based on said routing decision, obtains said additional audio from either of said first zone or said second zone; and
recognizes an additional utterance in said additional audio.

3. The system of claim 2, wherein said ASR module is configured of:
a first ASR sub-module that during a broad listening mode is enabled to receive and evaluate a mixed audio signal that includes audio from said first spatial zone, and audio from said second spatial zone;
a second ASR sub-module that during a selective listening mode for evaluating audio from said first spatial zone, is enabled to receive and evaluate said additional audio from said first spatial zone; and
a third ASR sub-module that during a selective listening mode for evaluating audio from said second spatial zone, is enabled to receive and evaluate said additional audio from said second spatial zone.

4. The system of claim 3, wherein said processor switches from said broad listening mode to said selective listening mode in response to said first ASR module recognizing said utterance.

5. The system of claim 3, wherein said SE module provides:
to said first ASR sub-module, a data stream comprising audio from said first spatial zone and said second spatial zone;

to said second ASR sub-module, a data stream of audio from said first spatial zone; and to said third ASR sub-module, a data stream of audio from said second spatial zone.

6. The system of claim 2, further comprising:

a first buffer that stores a most-recent several seconds of said first audio signal, thus yielding buffered first audio; and a second buffer that stores a most-recent several seconds said second audio signal, thus yielding buffered second audio, wherein said ASR module obtains said additional audio by accessing either of said buffered first audio or said buffered second audio, based on said routing decision.

7. The system of claim 1, wherein said zone activity information is buffered in said ASR module, thus yielding buffered zone activity information, wherein said ASR module generates a detection time window, and wherein said buffered zone activity information is processed on a section thereof that is given by said detection time window.

* * * * *